(12) United States Patent
Graif et al.

(10) Patent No.: US 11,030,133 B2
(45) Date of Patent: Jun. 8, 2021

(54) AGGREGATED IN-BAND INTERRUPT BASED ON RESPONSES FROM SLAVE DEVICES ON A SERIAL DATA BUS LINE

(71) Applicant: QUALCOMM Incorporated, San Diego, CA (US)

(72) Inventors: Sharon Graif, Zichron Yaakov (IL); Meital Zangvil, Haifa (IL); Tomer Rafael Ben-Chen, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/551,447

(22) Filed: Aug. 26, 2019

(65) Prior Publication Data

US 2020/0073833 A1   Mar. 5, 2020

Related U.S. Application Data

(60) Provisional application No. 62/724,873, filed on Aug. 30, 2018.

(51) Int. Cl.
*G06F 13/24* (2006.01)
*G06F 13/42* (2006.01)

(52) U.S. Cl.
CPC .......... *G06F 13/24* (2013.01); *G06F 13/4291* (2013.01)

(58) Field of Classification Search
CPC .............................. G06F 13/24; G06F 13/4291
See application file for complete search history.

(56) References Cited

U.S. PATENT DOCUMENTS

| 5,875,342 | A | 2/1999 | Temple |
| 9,904,637 | B2 * | 2/2018 | Sengoku ............. G06F 13/4282 |
| 10,496,562 | B1 * | 12/2019 | Graif .................... G06F 13/364 |
| 10,707,984 | B2 * | 7/2020 | Pitigoi-Aron ........... H04Q 9/04 |
| 2006/0136642 | A1 * | 6/2006 | Ooi ........................ G06F 13/24 |
| | | | 710/268 |
| 2014/0143469 | A1 | 5/2014 | Tran et al. |

(Continued)

FOREIGN PATENT DOCUMENTS

WO   2015143594 A1   10/2015
WO   2017062084 A1   4/2017

OTHER PUBLICATIONS

International Search Report and Written Opinion—PCT/US2019/048309—ISA/EPO—dated Nov. 20, 2019.

*Primary Examiner* — Tammara R Peyton
(74) *Attorney, Agent, or Firm* — Loza & Loza, LLP

(57) ABSTRACT

Methods and apparatuses for aggregated IBIs are provided. The apparatus includes a host controller configured to communicate with at least one slave via a serial communication bus, trigger and receive a series of responses from the at least one slave via the serial communication bus, determine one response of the series of responses indicating an in-band interrupt (IBI) request, and respond to the IBI request based on a position of the one response among the series of responses. The method includes communicating with at least one slave via a serial communication bus, triggering and receiving a series of responses from the at least one slave via the serial communication bus, determining one response of the series of responses indicating an in-band interrupt (IBI) request, and responding to the IBI request based on a position of the one response among the series of responses.

20 Claims, 5 Drawing Sheets

(56) References Cited

U.S. PATENT DOCUMENTS

2015/0100713 A1\* 4/2015 Sengoku ................. G06F 13/24
                                                      710/110
2018/0052791 A1\* 2/2018 Srivastava ............ G06F 13/364
2018/0181507 A1   6/2018 Foust et al.
2020/0201804 A1\* 6/2020 Graif ................. H04L 12/40143

\* cited by examiner

AGGREGATED IN-BAND INTERRUPT BASED ON RESPONSES FROM SLAVE DEVICES ON A SERIAL DATA BUS LINE

CROSS-REFERENCE TO RELATED APPLICATIONS

This application claims the benefit of and priority to U.S. Provisional Patent Application No. 62/724,873, entitled "AGGREGATED IN-BAND INTERRUPT", filed on Aug. 30, 2018, which is assigned to the assignee hereof and incorporated by reference in its entirety.

BACKGROUND

Field

The present disclosure relates generally to an interface between processors (e.g., master devices) and peripheral devices (e.g., slave devices) and, more particularly, enhancing capabilities for in-band interrupts.

Background

A computing device (e.g., a laptop, a mobile phone, etc.) may perform various functions, such as telephony, wireless data access, and camera/video function, etc. Such computing device may include a variety of components including circuit boards, integrated circuit (IC) devices and/or System-on-Chip (SoC) devices. The components may include processing circuits, user interface components, storage and other peripheral components that communicate through a serial bus. In one example, the serial bus may be operated in accordance with Inter-Integrated Circuit protocols, which may also be referred to as I2C protocols or $I^2C$ protocols. The I2C protocols are operable on a serial, single-ended bus used for connecting low-speed peripherals to a processor. In some examples, a serial bus may employ a multi-master protocol in which one or more devices can serve as a master and a slave for different messages transmitted on the serial bus. Data may be serialized and transmitted in a data signal carried on a Serial Data (SDA) line (SDA), in accordance with timing provided in a clock signal carried on a Serial Clock (SCL) Line.

In some examples, the serial bus may be operated in accordance with I3C protocols defined by the Mobile Industry Processor Interface (MIPI) Alliance. The I3C protocol can increase available bandwidth on the serial bus through higher transmitter clock rates, by encoding data in symbols defining signaling state of two or more wires, and/or through other encoding techniques including double data rate transmissions (where data is clocked using rising and falling edges of a transmitted clock signal). Certain aspects of the I3C protocol are derived from corresponding aspects of the I2C protocol, and the I2C and I3C protocols can coexist on the same serial bus (e.g., on the SDA line and the SCL line).

Within the I3C protocol, a slave device may signal an in-band interrupt (IBI) request to a master device (also referred to as an I3C host). IBI has proven to improve reduce system cost and design complexity, as out-of-band-band interrupt pins and connections are reduced/eliminated. However, performance improvement for IBIs is still desired and needed.

SUMMARY

This summary identifies features of some example aspects and is not an exclusive or exhaustive description of the disclosed subject matter. Additional features and aspects are described and will become apparent to persons skilled in the art upon reading the following detailed description and viewing the drawings that form a part thereof.

An apparatus in accordance with at least one embodiment includes a host controller configured to communicate with at least one slave via a serial communication bus, trigger and receive a series of responses from the at least one slave via the serial communication bus, determine one response of the series of responses indicating an in-band interrupt (IBI) request, and respond to the IBI request based on a position of the one response among the series of responses.

Another apparatus in accordance with at least one embodiment includes at least one slave comprising a position memory configured to store position information The at least one slave is configured to communicate with a host controller via a serial communication bus, detect a trigger for a series of responses from the host controller via the serial communication bus, and provide one response indicating an in-band interrupt (IBI) request among the series of responses on the serial communication bus, based the position information stored in the position memory, in response to detecting the trigger.

A method for operating aggregated in-band interrupts via a serial communication bus, in accordance with at least one embodiment, includes communicating, by a host controller, with at least one slave via a serial communication bus; triggering and receiving, by the host controller, a series of responses from the at least one slave via the serial communication bus; determining, by the host controller, one response of the series of responses indicating an in-band interrupt (IBI) request; and responding, by the host controller, to the IBI request based on a position of the one response among the series of responses.

Another method for operating aggregated in-band interrupts via a serial communication bus, in accordance with at least one embodiment, includes communicating, by at least one slave, with a host controller via a serial communication bus; detecting, by the at least one slave, a trigger for a series of response from the host controller via the serial communication bus; and providing, by the at least one slave, one response indicating an in-band interrupt (IBI) request among the series of responses on the serial communication bus, based the position information stored in a position memory, in response to detecting the trigger.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
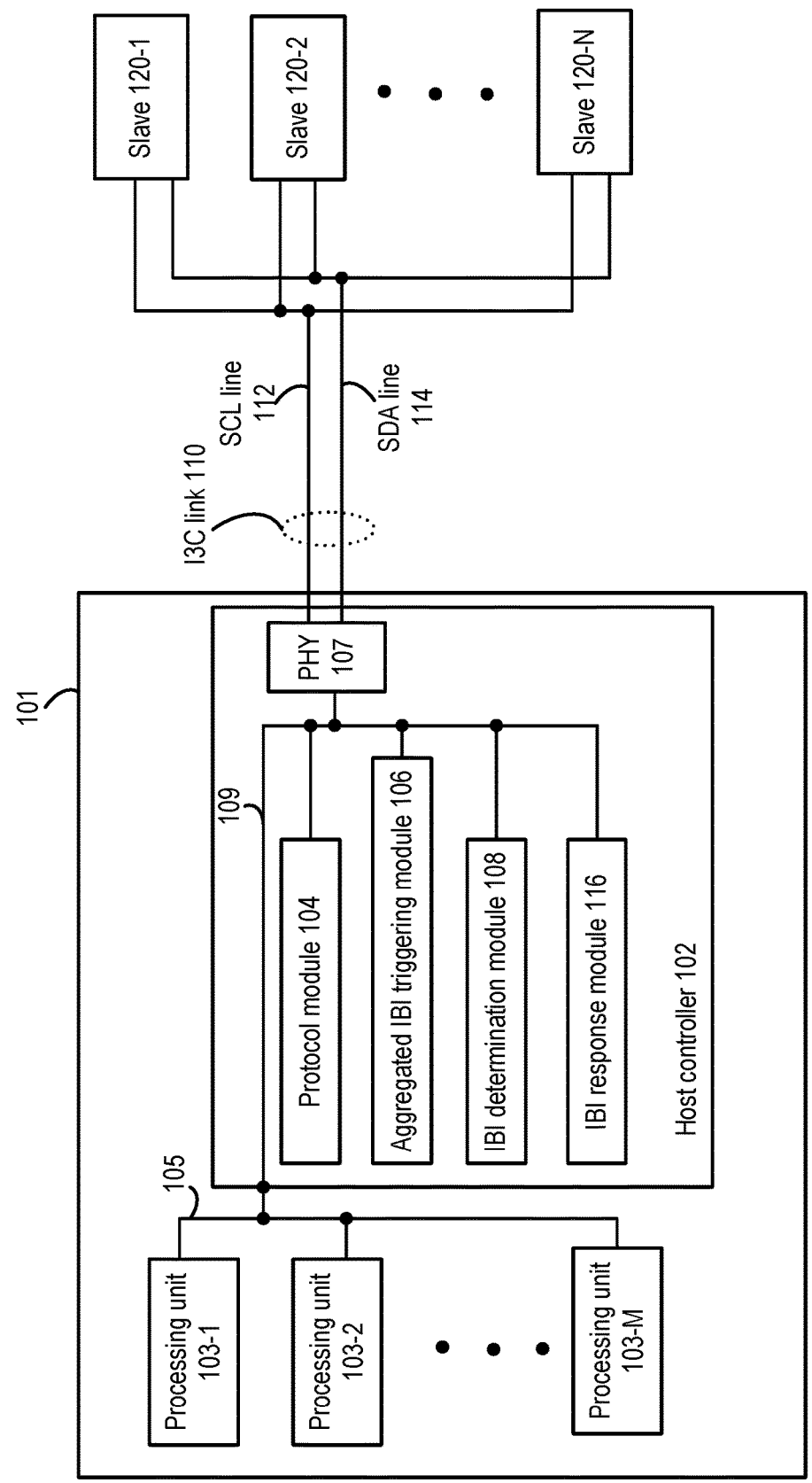
FIG. 1 illustrates components of an apparatus having a serial communication bus, in accordance with certain aspects of the disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B). In the case of electrical components, the term "coupled to" may also be used herein to mean that a wire, trace, or other electrically conductive material is used to electrically connect elements A and B (and any components electrically connected therebetween). In some examples, the term "coupled to" indicate having an electric current flowing between the elements A and B. In some examples, the term "electrically connected" may indicate having an electric current flowing between the elements A and B.

The terms "first," "second," "third," etc. are employed for ease of reference and may not carry substantive meanings. Likewise, names for components/modules may be adopted for ease of reference and might not limit the components/modules. For example, such non-limiting names may include "IBI handling" module, "IBI detection" module, "processing unit interrupt control" module, and/or "IBI response" module. Modules and components presented in the disclosure may be implemented in hardware, software, or a combination of hardware and software.

The term "bus system" may provide that elements coupled to the "bus system" may exchange information therebetween, directly or indirectly. In such fashion, the "bus system" may encompass multiple physical connections as well as intervening stages such as buffers, latches, registers, etc.

In the disclosure, a serial communication protocol may include, for example, an I3C specification. Examples of the I3C specification may include a MIPI Alliance I3C specification (e.g., the host controller being configured to operate an I3C link meeting all requirements of the MIPI I3C specification). In some examples, the I3C specification may include specifications from any standard-setting organization using part or all of an I3C link (e.g., an SCL line and an SDA line) and/or Common Command Codes provided by the MIPI Alliance I3C specification. In some examples, the serial communication protocol may include an I2C specification. A serial communication bus (e.g., the I3C link) may be a link that operates in accordance with the serial communication protocol.

A serial communication protocol, such as the I2C, may allow multiple interrupt request pins (and connections), which allow a slave (e.g., slave device) to signal to a master (e.g., master device) different types of interrupts. For example, certain ones of the interrupt pins might carry urgent interrupt requests, while the other ones might carry less urgent ones. Accordingly, the master may service the interrupt requests intelligently. For example, the master may respond to (e.g., service) the interrupt requests from the urgent pins before responding to the interrupt requests from the non-urgent ones. However, such scheme requires multiple pins and connections and accordingly, adds to design complexity and system cost.

Another serial communication protocol, such as the I3C, provides in-band interrupts (IBIs) to reduce pins and connections. IBI requests are made via a serial data line (known as SDA line) of an I3C link and therefore, no additional interrupt pins and connections are required. However, IBIs do not allow for differentiations among the requesting slaves or types of the interrupt requests. For example, in a Header Arbitration, multiple slaves may provide their addresses onto the SDA line to try to win the arbitration (e.g., in order to submit an IBI request). The master may recognize, starting with the most significant bit, only the Highs (logic is) in the arbitration. That is, a slave with all or mostly zeros in its address would never win the arbitration. Such slave may be starved from making IBI requests.

Methods and apparatuses for improved, efficient aggregated IBIs are presented. A master (via its host controller) may communicate with at least one slave via a serial communication bus, trigger and receive a series of responses from the at least one slave via the serial communication bus, determine one response of the series of responses indicating an in-band interrupt (IBI) request, and respond to the IBI request based on a position of the one response among the series of responses. A series of responses may include multiple responses in series (e.g., one after another). In some examples, the series of responses is provided in consecutive clock cycles. In some examples, the master may determine whether each of the series of responses indicates an IBI request. The master may respond to the IBI request based on a position of one response among the series of responses indicating the IBI request. For example, a first response among the series of responses may indicate the most urgent IBI request; and a second response among the series of responses may indicate the second most urgent IBI request; and so forth. In some examples, a first response among the series of responses may indicate an IBI request from a first slave, and a second response among the series of responses may indicate an IBI request from a second slave, and so forth. The master may elect to service the most urgent IBI request first or elect to service the least-serviced slave first. In such fashion, the aggregated IBI enables the master to respond (e.g., to service) the IBI requests intelligently by considering multiple IBI requests (aggregated IBI requests). Performance of the serial communication protocol would thus improve.

FIG. 1 illustrates components of an apparatus 100 having a serial communication bus, in accordance with certain aspects of the disclosure. The apparatus 100 may, for example, be one of a computing system (e.g., servers, datacenters, desktop computers), mobile computing device (e.g., laptops, cell phones, vehicles, etc.), Internet of Things device, and virtual reality or augmented reality system. The apparatus 100 includes some or all of a master 101 (e.g., master device), an I3C link 110, and at least one slave 120-1 to 120-N (e.g., slave devices). The master 101 may be, for example, an application processor that performs various functions (e.g., telephony, wireless data access, audio/video function, etc.) and communicates with the at least one slave 120-1 to 120-N via the I3C link 110, in a mobile device. The I3C link 110 provides an example of a serial communication bus and includes a Serial Clock (SCL) line 112 and a Serial Data (SDA) line 114.

The master 101 includes some or all of at least one processing unit (one or more) 103-1 to 103-M, a host controller 102, and a bus system 105. The bus system 105 may be one or more buses and may directly or indirectly connect the at least one processing unit 103-1 to 103-M to the host controller 102. The at least one processing unit 103-1 to 103-M may be, for example, central processing unit (CPU). In some examples, the at least one processing unit 103-1 to 103-M may be functional unit or units for performing various functions (e.g., telephony, wireless data access, audio/video function, etc.). For example, in a mobile device, the at least one processing unit 103-1 to 103-M may include a modem, an image signal processor, and/or multimedia modules. The at least one slave (e.g., one or more) 120-1 to 120-N may be, for example, various sensors. For example, the at least one slave 120-1 to 120-N may include a fingerprint sensor, a capacitive touch sensor, gyroscope, accelerometer, magnetometer and/or a camera, etc.

The host controller 102 includes some or all of a protocol module 104, an aggregated IBI triggering module 106, an IBI determination module 108, an IBI response module 116, and a bus system 109 coupling the modules of the host controller 102 and coupling to the bus system 105. The PHY 107 may be configured to control/operate a physical layer of a serial communication protocol (such as an I2C or I3C) in accordance with a specification. For example, the PHY 107 may be configured to detect states on the SDA line 114 and to operate (e.g., pull Low and pull High) the SCL line 112 and the SDA line 114. The SDA line 114 may be High by pulling the SDA line 114 or not driving the SDA line 114. The I2C or I3C may operate in an open-drain mode in which the SDA line 114 is pulled high via a resister to a voltage source. By not driving the SDA line 114, the SDA line would be High.

The protocol module 104 may be configured to, via the PHY 107, communicate with at least one slave 120-1 to 120-N via a serial communication bus (such as the I3C link 110), in accordance with a serial communication protocol (e.g., I2C or I3C). Such communications may include data exchanges among the at least one processing unit 103-1 to 103-M and the at least one slave 120-1 to 120-N (via the host controller 102).

The aggregated IBI triggering (AIT) module 106 may be configured to trigger an aggregated IBI, in which a series of responses from the at least one slave 120-1 to 120-N may be received via the I3C link 110. The IBI determination module 108 may be configured to determine certain whether each of the series of responses indicates an IBI request. The IBI response module 116 may be configured to respond to (e.g., service) the IBI request or requests indicated by the series of response. These modules are presented with additional information presented with FIG. 2.

Figure 2:
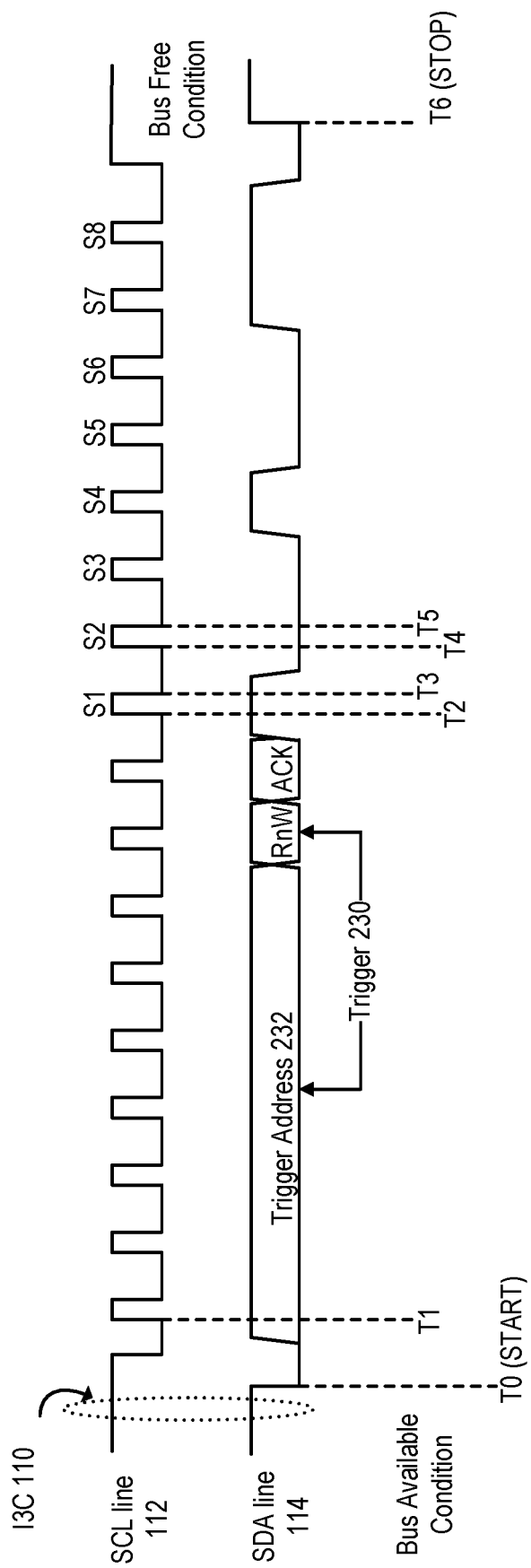
FIG. 2 illustrates waveforms of the I3C link for aggregated IBI requests, in accordance with certain aspects of the disclosure.

FIG. 2 illustrates waveforms of the I3C link 110 for aggregated IBI requests, in accordance with certain aspects of the disclosure. FIG. 2 includes signaling of the SCL line 112 and the SDA line 114. Initially (before T0), the I3C link 110 is in a Bus Available State (e.g., both the SCL line 112 and the SDA line 114 are High). At T0, the I3C link 110 enters into START (e.g. a High to Low transition on the SDA line 114, while the SCL line 112 is High). For example, the protocol module 104 (via the PHY 107; see FIG. 1) may be configured to pull the SDA line 114 from High to Low, while keeping the SCL line High, to signal the START.

AT T1, the master 101 issues a trigger 230 for a series of responses to the at least one slave 120-1 to 120-N (see FIG. 1), via the I3C link 110. For example, the AIT module 106 (via the PHY 107; see FIG. 1) may be configured to trigger and receive a series of responses from the at least one slave 120-1 to 120-N via the serial communication bus (e.g., the I3C link 110). The AIT module 106 may direct the PHY 107 to clock the SCL line 112 and to put the trigger 230 onto the SDA line 114. The trigger 230 may include a trigger address 232, an RnW bit indicating read or write, and/or an ACK (acknowledge) bit. The trigger address 232 and/or the RnW bit may uniquely (e.g., not shared with another function of a serial communication protocol) indicate a trigger for aggregated IBI requests. For example, the trigger address 232 may be 0x08 and the RnW bit may indicate a write, and the at least one slave 120-1 to 120-N may recognize this combination of the trigger address 232 and the RnW bit as the trigger 230 for a series of responses. In response, the at least one slave 120-1 to 120-N may use the ACK bit to acknowledge the master 101 via the I3C link 110.

Between T2 to T7, the at least one slave 120-1 to 120-N provides onto the I3C link 110 a series of responses S1-S8, based on predetermined positions. The term "predetermined" may indicate that the values were determined before the aggregated IBI requests. In some examples, positions among the series of responses S1-S8 may indicate sources among the at least one slave 120-1 to 120-N. For example, a position of the response S1 (e.g., first) may indicate a response (e.g., an IBI request) from a first slave 120-1; a position of the response S2 (e.g., second) may indicate a response (e.g., another IBI request) from a second slave 120-2; and so forth. In some examples, positions among the series of responses S0-S7 may indicate types of interrupt requests. In some examples, types of interrupt requests, including the IBI requests may be based on urgency or target portions (within a master) of the interrupt requests. For example, a position of the response S1 (e.g., first) may indicate a most urgent interrupt request or an interrupt request to a first portion of the master 101 (e.g., to a first processing unit 103-1). A position of the response S2 (e.g., second) may indicate a second most urgent interrupt request or an interrupt request to a second portion of the master 101 (e.g., to a second processing unit 103-2); and so forth.

In some examples, to signal no IBI requests, the at least one slave 120-1 to 120-N may be configured to keep the SDA line 114 High, and the master 101 might not need to acknowledge the response (e.g., keep the SDA line 114 High). For example, for the response S1 at T2, the SDA line 114 is High at a first edge (e.g., rising edge) of the SCL line 112 to indicate no interrupt request. The master 101 (e.g., the protocol module 104 of the host controller 102) may be configured to not acknowledge S0 in the example. For example, at T3, the protocol module 104 may be configured to keep the SDA line 114 High at a following edge (e.g., a falling edge following the first or rising edge) of the SCL line 112.

Figure 4:
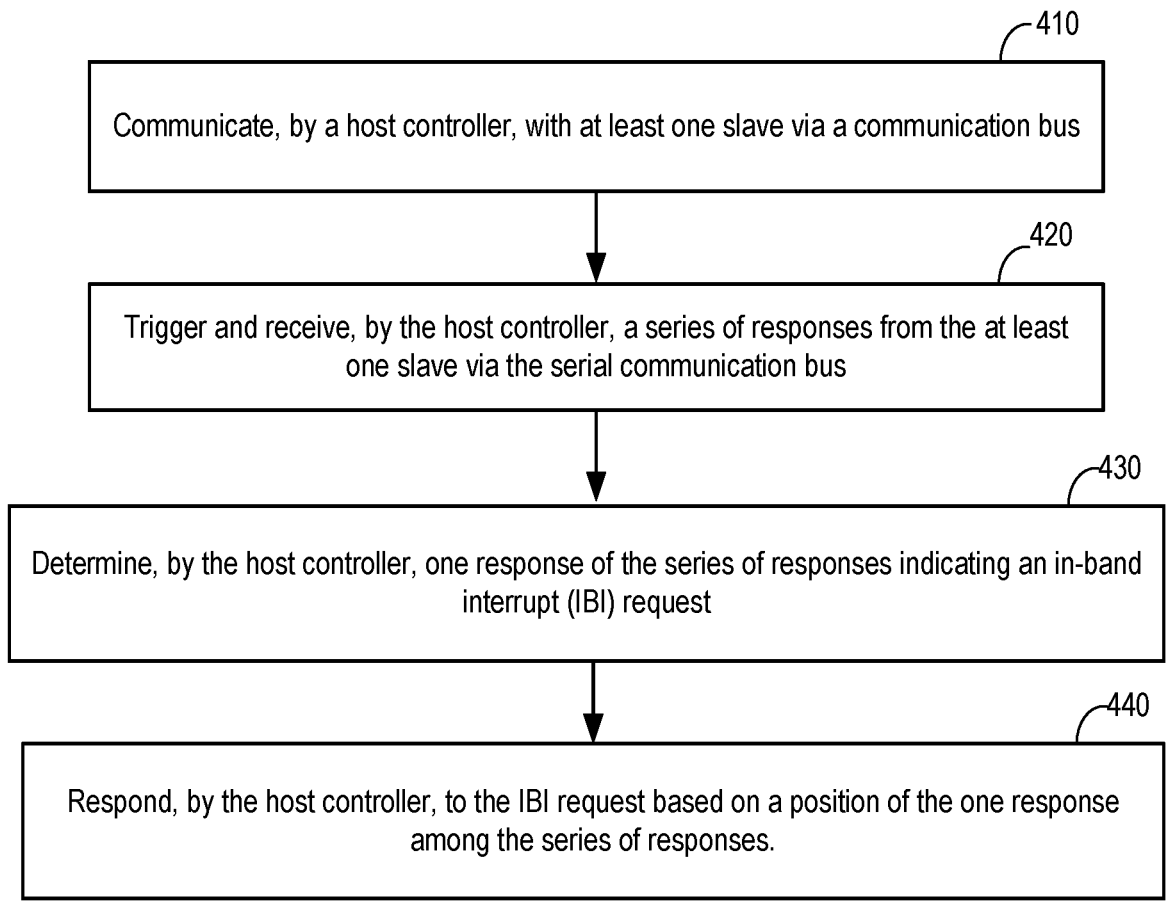
FIG. 4 illustrates a method for operating aggregated in-band interrupt requests over a serial communication bus, in accordance with certain aspects of the disclosure.

To signal an IBI request, the at least one slave 120-1 to 120-N may be configured to pull the SDA line 114 Low, and the master 101 may be configured acknowledge the IBI request. For example, for the response S2 at T4, the SDA line 114 is pulled Low at a first edge (e.g., rising edge) of the SCL line 112 to indicate an IBI request. The host controller 102 (e.g., the protocol module 104 via the PHY 107) may be configured to receive one response (e.g., the response S2) indicating the IBI request at the first edge (e.g., rising edge) of the SCL line 112 (at T4). At T5, the host controller 102 (e.g., the protocol module 104 via the PHY 107) may be configured to acknowledge the IBI request at a following edge (e.g., falling edge) of the SCL line 112. In some examples, the master 101 (e.g., the host controller 102) acknowledging the IBI request might not be required (e.g., the acknowledgement at T5 might not be required). In these examples, the at least one slave 120-1 to 120-N may be configured to handle operations at one edge (e.g., rising edge) of the SCL line 112, which would allow for communications over a longer I3C link 110. In FIG. 4, the responses S2, S3, S5, and S6 are the ones indicating IBI requests.

In such fashion, the host controller 102 (e.g., the IBI determination module 108) may be configured to determine whether each of the series of responses S1-S8 indicates an in-band interrupt (IBI) request. For example, the IBI determination module 108 may be configured to determine one response (e.g., one of the responses S2, S3, S5, and S6) of the series of responses (responses S1-S8) indicating an in-band interrupt (IBI) request by determine a state of the SDA line 114 at each rising edge of the SCL line 112. In the example, the host controller 102 (e.g., the IBI determination module 108) may determine responses S2, S3, S5, and S6 indicate IBI requests on the I3C link 110.

The host controller 102 (e.g., the IBI response module 116) may be configured to respond to an IBI request (detected by the IBI determination module 108) based on a position of the one response among the series of responses S1-S8. For example, each of the responses S2, S3, S5, and S6 indicates an IBI request detected by the IBI determination module 108. The response S2 is second in position; the response S3 is third; the response S5 is fifth; and the response S6 is sixth among the series of responses S1-S8. In some examples, the positions among the series of responses S1-S8, including the positions of the responses S2, S3, S5, and S6 indicating the detected IBI requests, may indicate types of interrupt requests.

The types of interrupt requests may be based on target portions of the master 101 of the interrupt requests. For example, the positions may indicate the detected IBI requests being directed at different portions of the master 101. For example, a first position may indicate an IBI request directed to the first processing unit 130-1; a second position may indicate an IBI request directed to the second processing unit 130-2; and so forth. The host controller 102 (e.g., the IBI response module 116) may be configured to respond to the detected IBI requests based on the types of interrupt requests, as indicated by the positions of the corresponding requests S1-S8. For example, the IBI response module 116 may be configured to respond to (e.g., service) the IBI request indicated by the response S6 first, in a case the target portion (a sixth processing unit 103-6 in this example) of the IBI request is performing the most urgent task.

In some examples, the types of interrupt requests may be based on urgency of the interrupt requests. For example, the positions may indicate the detected IBI requests being of different urgency levels. In some examples, a first position may indicate a most urgent IBI request; a second position may indicate a second most urgent IBI request; and so forth, the IBI response module 116 may be configured to respond by servicing the most urgent IBI request first. In the example, the IBI request indicated by the response S2 would be serviced first by IBI response module 116 as the most urgent (as indicated by its position among the series of responses S1-S8).

In some examples, the positions among the series of responses S1-S8 may indicate sources among the at least one slave 120-1 to 120-N. For example, a first position may indicate the response (e.g., the IBI request) being from the first slave 120-1; a second position may indicate the response being from the second slave 120-2; and so forth. In some examples, the IBI response module 116 may be configured to service a requesting slave if the requesting slave is starved (e.g., not being service for a predetermined time period). For example, the IBI response module 116 may be configured to determine that a sixth slave 120-6 issuing the response S6 is starved over the predetermines time period and accordingly, respond to the IBI request indicated by the response S6 first. In such fashion, the IBI response module 116 may intelligently service the aggregated IBI requests and avoid starving a slave from accessing the host through IBI.

At T6, the I3C link 110 enters a STOP condition by both the SCL line 112 and the SDA line 114 going High. The I3C link 110 then enters a Bus Free Condition (a predecessor of the Bus Available Condition), and the I3C link 110 is released.

Figure 3:
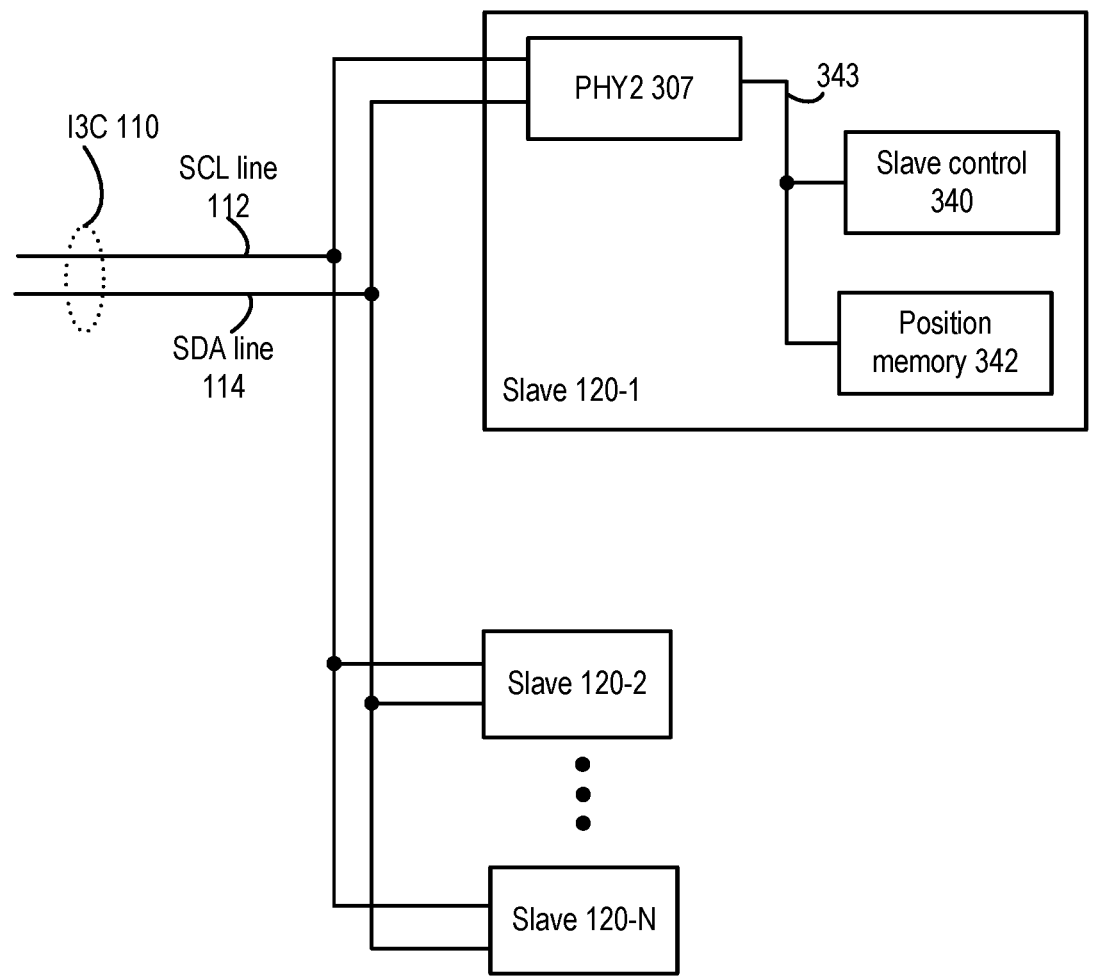
FIG. 3 illustrates components of the at least one slave of FIG. 1, in accordance with certain aspects of the disclosure.

FIG. 3 illustrates components of the at least one slave 120-1 to 120-N of FIG. 1, in accordance with certain aspects of the disclosure. The first slave 120-1 includes some or all of a PHY2 307, a slave control 340, a position memory 342, and a bus system 343. The bus system 343 couples the components of the first slave 120-1. The position memory may be a volatile or non-volatile memory and may be configured to store position information. The position information may provide types of interrupt requests indicated by positions of a series of responses from the at least one slave 120-1 to 120-N (e.g., responses S1 to S8 of FIG. 2). For example, as presented with FIG. 2, the types of interrupt requests (e.g., IBI requests) may be classified based on urgency of the IBI requests or target portions of the master 101 (see FIG. 1) of the IBI requests.

In some examples, the position information may provide an order of sources (among the at least one slave 120-1 to 120-N) of the series of responses, indicated by positions among the series of response (e.g., responses S1-S8 of FIG. 2). For example, the position information may indicate the first slave 120-1 as a source of the first response S1, the second slave 120-2 as a source of the second response S2, and so forth.

The PHY2 307 may be configured to detect states on and to operate the I3C link 110 (e.g., pull the SDA line 114 Low). The slave control 340 may be configured to communicate with a host controller 102 (see FIG. 1), via the bus system 343, the PHY2 307, and a serial communication bus (e.g., the I3C link 110). The slave control 340 may be further configured to detect, from the host controller 102 (via the PHY2 307, the bus system 343, and the serial communication bus (e.g., the I3C link 110)) a trigger for a series of responses. For example, referring to FIG. 2, the slave control 340 may detect the trigger 230 including the trigger address 232 and the RnW bit.

The slave control 340 may be further configured to provide (at least) one response indicating an in-band interrupt (IBI) request among the series of responses on the serial communication bus, based the position information stored in the position memory, in response to detecting the trigger. For example, referring to FIG. 2, the slave control 340 may be configured to provide the response S2 at T4, the response S2 indicating an IBI request (the slave control 340 via the bus system 343 and the PHY2 307 pulling the SDA line 114 Low). The response S2 indicting the IBI request is among the series of responses S1-S8 provided in response to the trigger 230. In such fashion, the series of responses S1-S8 may indicate multiple IBI requests (e.g., indicated by the responses S2, S3, S5, and S6) in response to a single trigger. Such scheme may accordingly be referred to as aggregated IBI.

The at least one slave 120-1 to 120-N may provide the series of responses S1-S8 onto the I3C link 110 based on the position information stored in the position memory 342. For example, the position information indicates types of interrupt requests may be based on positions of the series of responses S1-S8 provided by the at least one slave 120-1 to 120-N. For example, as presented with FIG. 2, the types of interrupt requests (e.g., IBI requests) may be classified based on urgency of the IBI requests or target portions of the master 101 (see FIG. 1) of the IBI requests. For example, referring to FIG. 2, the at least one slave 120-1 to 120-N may provide the response S2 to indicate a more urgent IBI request (more urgent than an IBI request indicted by the response S3), based on the position information stored in the position memory 342.

In some examples, the position information may indicate a source (among the at least one slave 120-1 to 120-N) of a response indicating an IBI request based on a position of the one response among the series of responses (e.g., responses S1 to S8 of FIG. 2). For example, the position information may indicate the first slave 120-1 as a source of the first response S1, the second slave 120-2 as a source of the second response S2, and so forth. In one example, based on the position information stored in the position memory 342, the second slave 120-2 may provide the response S2 indicating an IBI request; the third slave 120-3 may provide the response S3 indicating a different IBI request, and so forth.

FIG. 4 illustrates a method for operating aggregated in-band interrupt requests over a serial communication bus, in accordance with certain aspects of the disclosure. The operations of FIG. 4 may be implemented by, for example, the apparatus 100 presented with FIG. 1. The arrows indicate certain relationships among the operations, but not necessarily sequential relationships. At 410, at least one slave is communicated with by a host controller via a serial communication bus. For example, referring to FIG. 1, the host controller 102 of the master 101 (e.g., via the protocol module 104 and the PHY 107) communicates with at least one slave 120-1 to 120-N via the I3C link (e.g., the serial communication bus), in accordance with an I3C specification. At 420, a series of responses from the at least one slave is triggered and received by the host controller via the serial communication bus. Referring to FIG. 2, the host controller 102 (e.g., via the aggregated IBI triggering module 106 and the PHY 107) provides the trigger 230 via the I3C link 110 and receives (e.g., via the PHY 107) a series of responses S1-S8, via the I3C link.

At 430, one response of the series of responses is determined by the host controller to indicate an in-band interrupt (IBI) request. Referring to FIG. 2, the host controller 102 (e.g., the IBI determination module 108), determines that the SDA line 114 is pulled Low at the responses S2, S3, S5, and S6 (among the series of responses S1-S8) and determines that the responses S2, S3, S5, and S6 indicate IBI requests.

At 440, the IBI request is responded to by the host controller based on a position of the one response among the series of response. For example, the host controller 102 (e.g., the IBI response module 116) responds to an IBI request (detected by the IBI determination module 108) based on a position of the one response among the series of responses S1-S8. For example, each of the responses S2, S3, S5, and S6 indicates an IBI request detected by the IBI determination module 108. The response S2 is second in position; the response S3 is third; the response S5 is fifth; and the response S6 is sixth among the series of responses S0-S7. In some examples, the positions among the series of responses S1-S8, including the positions of the responses S2, S3, S5, and S6 indicating the detected IBI requests, indicate types of interrupt requests. In some examples, the positions among the series of responses S1-S8 may indicate sources among the at least one slave 120-1 to 120-N. In some examples, the IBI response module 116 responds (e.g., services) the IBI requests indicated by the responses S2, S3, S5, and S6 based on the positions of the responses S2, S3, S5, and S6 (in other words, based on types of the interrupt requests or sources of the interrupt requests, indicated by the positions).

Figure 5:
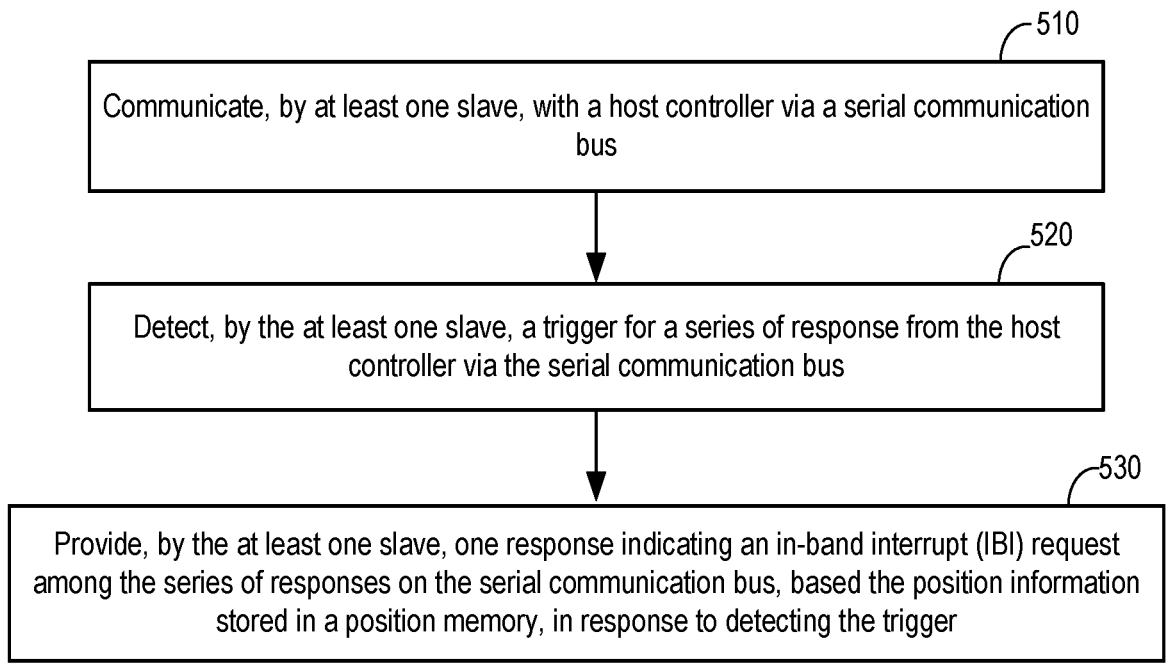
FIG. 5 illustrates another method for operating aggregated in-band interrupts over a serial communication bus, in accordance with certain aspects of the disclosure.

FIG. 5 illustrates another method for operating aggregated in-band interrupts over a serial communication bus, in accordance with certain aspects of the disclosure. The operations of FIG. 5 may be implemented by, for example, the apparatus 100 presented with FIG. 1 and/or components of the at least one slave 120-1 to 120-N of FIG. 3. The arrows indicate certain relationships among the operations, but not necessarily sequential relationships. At 510 a host controller, at least one slave is communicated with via a serial communication bus. For example, referring to FIG. 1, the host controller 102 of the master 101 communicates with at least one slave 120-1 to 120-N (e.g., via the PHY2 307; see FIG. 3), via the I3C link (e.g., the serial communication bus), in accordance with an I3C specification.

At 520, a trigger for a series of responses from the host controller is detected by the at least one slave via the serial communication bus. For example, referring to FIG. 3, the slave control 340 (e.g., via the slave control 340 and the PHY2 307) detects a trigger for a series of responses from the host controller 102. For example, referring to FIG. 2, the slave control 340 may detect the trigger 230 including the trigger address 232 and the RnW bit.

At 530, one response indicating an in-band interrupt (IBI) request among the series of responses is provided by the at least one slave on the serial communication bus, based the position information stored in a position memory, in response to detecting the trigger. For example, referring to FIG. 3, the slave control 340 provides (at least) one response indicating an in-band interrupt (IBI) request among the series of responses on the I3C link 110 (e.g., the serial communication bus), based the position information stored in the position memory 342 (see FIG. 3), in response to detecting the trigger 230 (see FIG. 2). For example, referring to FIG. 2, the slave control 340 provides the response S2 at T4, the response S2 indicating an IBI request (the slave control 340 via the bus system 343 and the PHY2 307 pulling the SDA line 114 Low). The response S2 indicting the IBI request is among the series of responses S1-S8 provided in response to the trigger 230. In such fashion, the series of responses S1-S8 indicates multiple IBI requests (e.g., indicated by the responses S2, S3, S5, and S6) in response to a single trigger 230. Such scheme may accordingly be referred to as aggregated IBI or aggregated IBI response.

For example, the at least one slave 120-1 to 120-N provides the series of responses S1-S8 onto the I3C link 110 based on the position information stored in the position memory 342. For example, the position information indicates types of interrupt requests based on positions of the series of responses S1-S8 provided by the at least one slave 120-1 to 120-N. For example, as presented with FIG. 2, the types of interrupt requests (e.g., IBI requests) may be classified based on urgency of the IBI requests or target portions of the master 101 (see FIG. 1) of the IBI requests. For example, referring to FIG. 2, the at least one slave 120-1 to 120-N may provide the response S2 to indicate a more urgent IBI request (more urgent than an IBI request indicted by the response S3), based on the position information stored in the position memory 342.

In some examples, the position information may indicate a source (among the at least one slave 120-1 to 120-N) of a response indicating an IBI request based on a position of the one response among the series of responses (e.g., responses S1 to S8 of FIG. 2). For example, the position information may indicate the first slave 120-1 as a source of the first response S1, the second slave 120-2 as a source of the second response S2, and so forth. In one example, based on the position information stored in the position memory 342, the second slave 120-2 may provide the response S2 indicating an IBI request; the third slave 120-3 may provide the response S3 indicating a different IBI request, and so forth.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus, comprising:
a host controller configured to:
transmit a trigger for a series of responses to at least one slave via a serial communication bus,
receive the series of responses from the at least one slave via the serial communication bus in response to transmitting the trigger,
determine a first response of the series of responses indicating an in-band interrupt (IBI) request, and
respond to the IBI request based on a position of the first response among the series of responses.

2. The apparatus of claim 1, wherein:
the serial communication bus comprises a serial clock (SCL) line and a serial data (SDA) line, and
the host controller is configured to receive the one response indicating the IBI request at an edge of the SCL line.

3. The apparatus of claim 2, wherein the host controller is further configured to acknowledge the IBI request at a following edge of the SCL line.

4. The apparatus of claim 1, wherein one or more positions, among the series of responses and including the position of the first response, indicate one or more sources among the at least one slave.

5. The apparatus of claim 4, wherein the apparatus further comprises one of:
a computing system incorporating the at least one slave and the serial communication bus,
a mobile computing system incorporating the at least one slave and the serial communication bus,
an Internet of Things (IoT) device incorporating the at least one slave and the serial communication bus,
a virtual reality system incorporating the at least one slave and the serial communication bus, or
an augmented reality system incorporating the at least one slave and the serial communication bus.

6. The apparatus of claim 1, wherein one or more positions, among the series of responses and including the position of the first response, indicate one or more types of interrupt requests.

7. The apparatus of claim 6, wherein the apparatus further comprises one of:
a computing system incorporating the at least one slave and the serial communication bus,
a mobile computing system incorporating the at least one slave and the serial communication bus,
an Internet of Things (IoT) device incorporating the at least one slave and the serial communication bus,
a virtual reality system incorporating the at least one slave and the serial communication bus, or
an augmented reality system incorporating the at least one slave and the serial communication bus.

8. A method for performing aggregated in-band interrupts at a host controller and via a serial communication bus, the method comprising:
transmitting a trigger for a series of responses to at least one slave via a serial communication bus;
receiving the series of responses from the at least one slave via the serial communication bus;
determining a first response of the series of responses indicating an in-band interrupt (IBI) request; and
responding to the IBI request based on a position of the first response among the series of responses.

9. The method of claim 8, wherein:
the serial communication bus comprises a serial clock (SCL) line and a serial data (SDA) line, and the method further comprises:
receiving the first response at an edge of the SCL line.

10. The method of claim 9, further comprising:
acknowledging the IBI request at a following edge of the SCL line.

11. The method of claim 8, wherein one or more positions, among the series of responses and including the position of the first response, indicate one or more sources among the at least one slave.

12. The method of claim 8, wherein one or more positions, among the series of responses and including the position of the first response, indicate one or more types of interrupt requests.

13. An apparatus, comprising:
at least one slave configured to:
detect a trigger for a series of responses from a host controller via a serial communication bus, and provide the series of responses via the serial communication bus in response to detecting the trigger, wherein the series of responses includes a first response indicating an in-band interrupt (IBI) request located at a position among the series of responses.

14. The apparatus of claim 13, wherein:
the serial communication bus comprises a serial clock (SCL) line and a serial data (SDA) line, and
the at least one slave is configured to transmit the first response indicating the IBI request at an edge of the SCL line.

15. The apparatus of claim 14, wherein the at least one slave is further configured to receive an acknowledge to the IBI request from the host controller at a following edge of the SCL line.

16. The apparatus of claim 13, wherein:
the at least one slave comprises a position memory configured to store position information, and
the position of the first response among the series of response is determined based on the position information.

17. The apparatus of claim 13, wherein the position of the first response indicates a source of the first response among the series of responses.

18. The apparatus of claim 17, wherein the host controller and the serial communication system are incorporated in one of:
a computing system,
a mobile computing system,
an Internet of Things (IoT) device,
a virtual reality system, or
an augmented reality system.

19. The apparatus of claim 13, wherein the position of the first response among the series of responses indicates a type of IBI request included in the first response.

20. The apparatus of claim 19, wherein at least one of the host controller or the serial communication system is incorporated in one of:
a computing system,
a mobile computing system,
an Internet of Things (IoT) device,
a virtual reality system, or
an augmented reality system.

* * * * *